E. L. KING.
CHURN.
APPLICATION FILED MAR. 3, 1908.

960,955.

Patented June 7, 1910.

Witnesses
Hugh H. Ott

Inventor
Ezra L. King

By Victor J. Evans
Attorney

UNITED STATES PATENT OFFICE.

EZRA L. KING, OF BUCHANAN, TENNESSEE.

CHURN.

960,955.  Specification of Letters Patent.  Patented June 7, 1910.

Application filed March 3, 1908. Serial No. 418,991.

*To all whom it may concern:*

Be it known that I, EZRA L. KING, a citizen of the United States, residing at Buchanan, in the county of Henry and State of Tennessee, have invented new and useful Improvements in Churns, of which the following is a specification.

This invention relates to a dasher operating mechanism for churns, and the object of the invention is to provide a device of this character which is easily attached to or detached from a churning tub of the ordinary construction, and which provides a novel feature of dasher whereby a reciprocatory and a rotary movement is given to the dasher at each operation of a handle connected with a dasher rod, whereby cream may be easily and quickly churned to butter.

Another object of the invention is to provide a dasher operating mechanism for churns having the operating parts and dasher exposed for the ready cleansing of the dasher and operating mechanism.

With these and other objects in view the invention resides in the novel construction of elements and their arrangement in operative combination hereinafter described and claimed.

Figure 1:
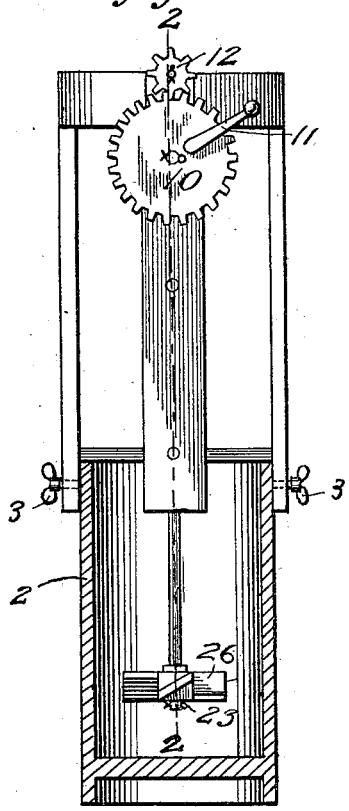
Figure 2:
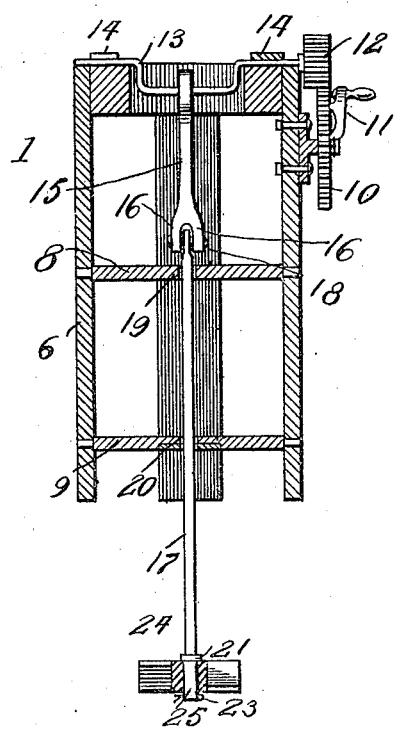
Figure 3:
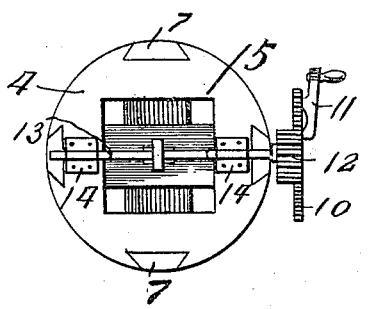

In the drawing, Figure 1 is a front elevation of my improved operating mechanism, in applied position upon a churn, the churn being shown in dotted lines. Fig. 2 is a vertical section upon the line 2—2 of Fig. 1, and Fig. 3 is a top plan view of the device.

The contemplation of my device provides for a suitable skeleton frame 1, of any desired or preferred construction and adapted to fit over the mouth of a churn 2, and be retained thereon by wing bolts 3 or any other suitable securing means. It is desirable to have a frame constructed of as few parts as will render it staunch and effective in supporting the operating mechanism for the churn dasher, and which will in substance present a skeleton frame, whereby the mechanism is readily accessible for cleansing, and in the construction illustrated in the drawing, I have provided a head 4 having a central opening 5 and depending arms 6, secured to the head by the dovetails 7, and provided with the upper cross arms 8 and the lower cross arms 9. The mouth of the churn 2, is adapted to be secured within the circle formed by the depending arms 6 of the frame, and to abut against the lower cross arms 9 of the frame and to be securely held in position by the nuts 3 provided upon the lower extremities of the depending arms 6.

Upon one of the depending arms 6, I have mounted a suitable toothed wheel 10 having an operating handle 11, and adapted to mesh with a cog wheel 12 rigidly secured upon a crank shaft 13. The shaft 13 is mounted within bearings 14 upon the head 4 of the frame, and the offset portion of the shaft is adapted to rotate within the opening 5 of the head of the frame. Secured upon the offset portion of the crank shaft 13 is a suitable pitman rod 15, having a bifurcation at its free extremity to provide the ears 16, between which the dasher rod 17 is pivoted by a bolt or pin 18. The cross arms 8 and 9 of the frame 1, are provided with suitable openings 19 and 20, through which the dasher rod 17 works and is maintained in a vertical position. A collar 21 is provided near the extremity of the dasher rod 17 and acts as a stop for a dasher 22, rotatably mounted upon the extremity of the dasher rod 17, and held in position thereon by a cotter pin 23, engaging a suitable perforation within the extremity of the dasher rod 17.

The dasher 22 comprises a body portion 24 provided with a central opening 25 by which it is secured upon the dasher rod 17, and a series of arms 26, deflecting from the top to the bottom of the body portion of the dasher.

With the construction just described it will be noted that the dasher is given a reciprocatory movement when the handle 11 of the toothed wheel 10 is turned, and that the dasher being pivoted to the dasher rod and acting against the pressure of the cream in the churn is caused to revolve in one direction upon the upward movement of the dasher rod and in an opposite direction upon the return movement of the rod, thus presenting an extremely simple, cheap and effective means whereby cream is effectively agitated and butter easily and quickly churned. It will be further noted that I have provided a dasher frame and operating mechanism for churns which may be easily attached to and readily removed from a churn, and which is so constructed that the operating parts are readily accessible, and in which the dasher may be readily removed for cleansing.

While I have described the preferred embodiment of the device, it will of course be understood that minor details of construction may be resorted to without departing from the spirit or sacrificing any of the advantages of the invention.

Having thus fully described the invention what is claimed as new is:

In combination with a churn body, a frame comprising a head, vertical arms depending from the head and upper and lower cross arms connecting said vertical arms, said lower cross arms being disposed at a point above the lower ends of said vertical arms and bearing on the upper side of said churn body, the depending lower ends of said vertical arms bearing on the outer side of said churn body, and said upper and lower cross arms having alining central openings, a gear wheel having its bearings on the outer side of one of the vertical arms, said gear wheel being provided with a crank arm, a shaft mounted in bearings on the head, having a pinion engaging said gear wheel and provided at its central portion with a crank, operating in a central opening in the head, a dasher shaft mounted for reciprocatory movement in the central openings of the cross arms, a pitman connecting said dasher shaft to the crank, a dasher at the lower end of said dasher shaft, and a set screw in the lower end portions of the said vertical arms and engaging the said churn body.

In testimony whereof I affix my signature in presence of two witnesses.

EZRA L. KING.

Witnesses:
 LUCIAN RENY,
 W. E. FISHER.